United States Patent
Yang et al.

(10) Patent No.: US 9,113,467 B2
(45) Date of Patent: Aug. 18, 2015

(54) ADJUSTING INITIAL TRANSMIT POWER FOR HIGH SPEED DATA TRANSMISSION

(71) Applicant: QUALCOMM Incorporated, San Diego, CA (US)

(72) Inventors: Ming Yang, San Diego, CA (US); Tom Chin, San Diego, CA (US); Guangming Shi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 13/780,688

(22) Filed: Feb. 28, 2013

(65) Prior Publication Data

US 2014/0241327 A1    Aug. 28, 2014

(51) Int. Cl.
| | |
|---|---|
| *H04W 4/00* | (2009.01) |
| *H04W 72/04* | (2009.01) |
| *H04W 52/14* | (2009.01) |
| *H04W 52/28* | (2009.01) |
| *H04W 52/50* | (2009.01) |

(52) U.S. Cl.
CPC ........ *H04W 72/0446* (2013.01); *H04W 52/146* (2013.01); *H04W 52/286* (2013.01); *H04W 52/50* (2013.01)

(58) Field of Classification Search
CPC ..... H04W 52/00; H04W 52/02; H04W 52/04; H04W 52/32
USPC .......................................... 370/252, 336, 345
See application file for complete search history.

(56) References Cited

U.S. PATENT DOCUMENTS

| | | | | |
|---|---|---|---|---|
| 6,091,757 | A  * | 7/2000 | Cudak et al. ................... | 375/130 |
| 6,233,231 | B1 * | 5/2001 | Felix et al. .................... | 370/335 |
| 8,204,007 | B2   | 6/2012 | Terry et al. | |
| 2007/0217367 | A1 * | 9/2007 | Lee et al. ....................... | 370/335 |
| 2009/0181710 | A1 * | 7/2009 | Pani et al. ...................... | 455/509 |
| 2009/0201865 | A1 * | 8/2009 | Uemura et al. ................ | 370/329 |
| 2009/0316811 | A1 * | 12/2009 | Maeda et al. .................. | 375/260 |
| 2010/0048236 | A1 * | 2/2010 | Higuchi et al. ................ | 455/522 |
| 2010/0067463 | A1 * | 3/2010 | Masaoka ........................ | 370/329 |
| 2010/0202392 | A1 | 8/2010 | Zhang et al. | |
| 2011/0098053 | A1 * | 4/2011 | Widegren et al. ............. | 455/450 |
| 2011/0110337 | A1 * | 5/2011 | Grant et al. .................... | 370/335 |
| 2011/0188422 | A1 * | 8/2011 | Ostergaard et al. ........... | 370/311 |

(Continued)

FOREIGN PATENT DOCUMENTS

| | | |
|---|---|---|
| CN | 101373996 A | 2/2009 |
| CN | 102196546 A | 9/2011 |

(Continued)

OTHER PUBLICATIONS

International Search Report and Written Opinion—PCT/US2014/018225—ISA/EPO—Apr. 10, 2014.

(Continued)

*Primary Examiner* — Farah Faroul
(74) *Attorney, Agent, or Firm* — Seyfarth Shaw LLP

(57) ABSTRACT

A method of wireless communication adjusts the transmit power for high speed data communications. A UE determines whether a random access channel is configured on an uplink traffic time slot. When the random access channel is configured on the uplink traffic time slot, the UE transmits a high speed data channel with adjusted transmit (TX) power based at least in part on transmit power used for a scheduling request.

20 Claims, 5 Drawing Sheets

(56) References Cited

U.S. PATENT DOCUMENTS

| | | | |
|---|---|---|---|
| 2011/0242990 A1* | 10/2011 | Simonsson et al. | 370/242 |
| 2012/0201182 A1* | 8/2012 | Kwon et al. | 370/311 |
| 2012/0207131 A1* | 8/2012 | Chin et al. | 370/331 |
| 2013/0142119 A1* | 6/2013 | Wong | 370/328 |
| 2013/0322324 A1* | 12/2013 | Kim et al. | 370/315 |
| 2014/0192727 A1* | 7/2014 | Liu et al. | 370/329 |

FOREIGN PATENT DOCUMENTS

| | | |
|---|---|---|
| CN | 102281617 A | 12/2011 |
| WO | 2010101508 A1 | 9/2010 |
| WO | 2012071726 | 6/2012 |

OTHER PUBLICATIONS

Qualcomm Europe et al., "Initial DPCCH transmit power setting in DC-HSUPA", 3GPP Draft; R1-092625 Initial DPCCH Transmit Power Setting in DC-HSUPA, 3rd Generation Partnership Project (3GPP), Mobile Competence Centre, 650, Route Des Lucioles; F-06921 Sophia-Antipolis Cedex, France, No. Los Angeles, USA; Jun. 24, 2009, 2 pages, XP050351118, [retrieved on Jun. 24, 2009] paragraph [0001]—paragraph [0002].

* cited by examiner

US 9,113,467 B2

ADJUSTING INITIAL TRANSMIT POWER FOR HIGH SPEED DATA TRANSMISSION

BACKGROUND

1. Field

Aspects of the present disclosure relate generally to wireless communication systems, and more particularly, to improving uplink throughput in a wireless network, such as a Time Division-High-Speed Uplink Packet Access (TD-HSUPA) network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes determining whether a random access channel is configured on an uplink traffic time slot. The method also includes transmitting a high speed data channel with adjusted transmit (TX) power. The adjusted TX power is based at least in part on transmit (TX) power used for a scheduling request when the random access channel is configured on the uplink traffic time slot.

Another aspect discloses wireless communication having a memory and at least one processor coupled to the memory. The processor(s) is configured to determine whether a random access channel is configured on an uplink traffic time slot. The processor(s) is also configured to transmit a high speed data channel with adjusted transmit (TX) power based at least in part on transmit (TX) power used for a scheduling request when the random access channel is configured on the uplink traffic time slot.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of determining whether a random access channel is configured on an uplink traffic time slot. The program code also causes the processor(s) to transmit a high speed data channel with adjusted transmit (TX) power based at least in part on transmit (TX) power used for a scheduling request when the random access channel is configured on the uplink traffic time slot.

Another aspect discloses an apparatus including means for determining whether a random access channel is configured on an uplink traffic time slot. Also included is means for transmitting a high speed data channel with adjusted transmit (TX) power based at least in part on transmit (TX) power used for a scheduling request when the random access channel is configured on the uplink traffic time slot.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
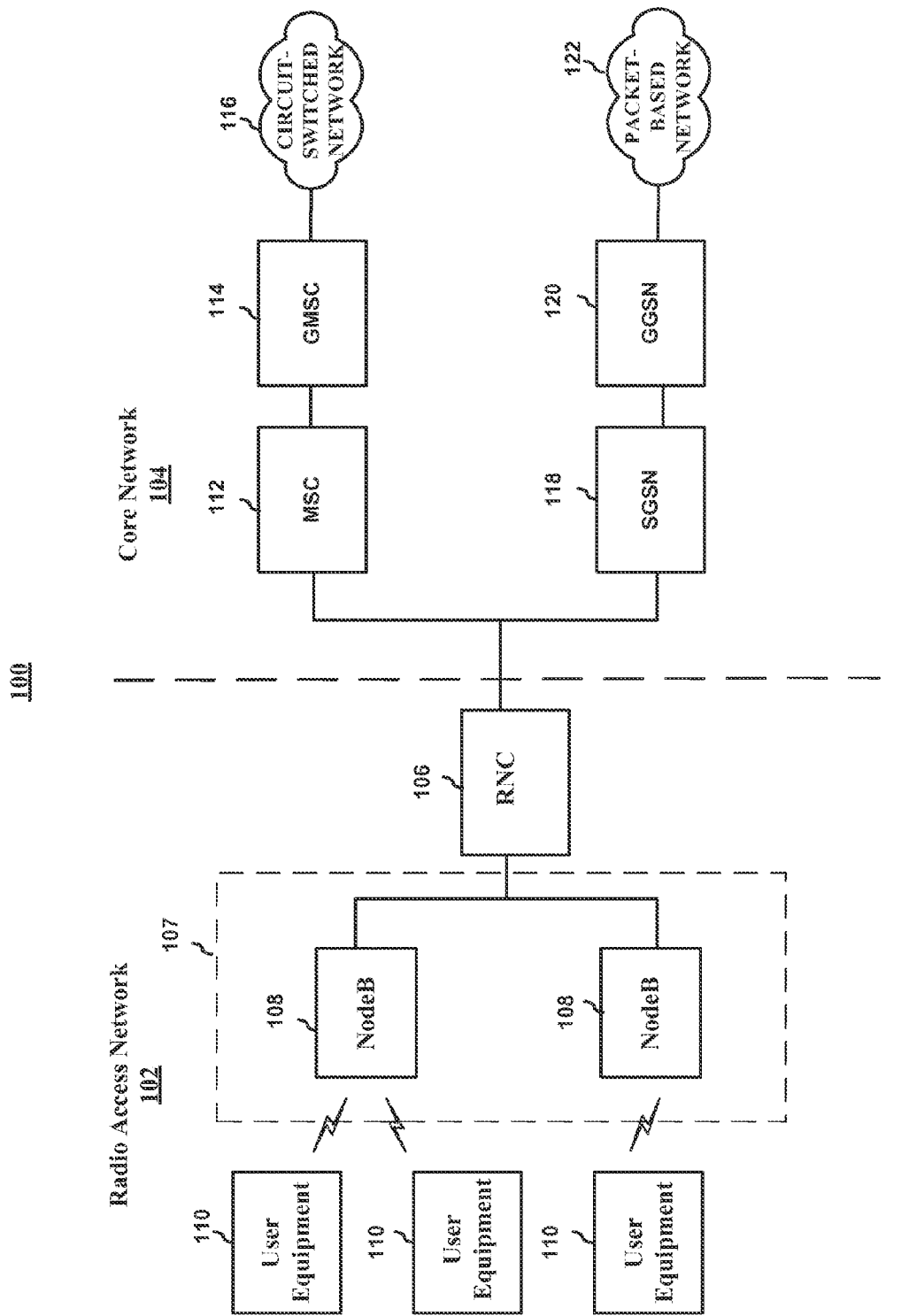
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
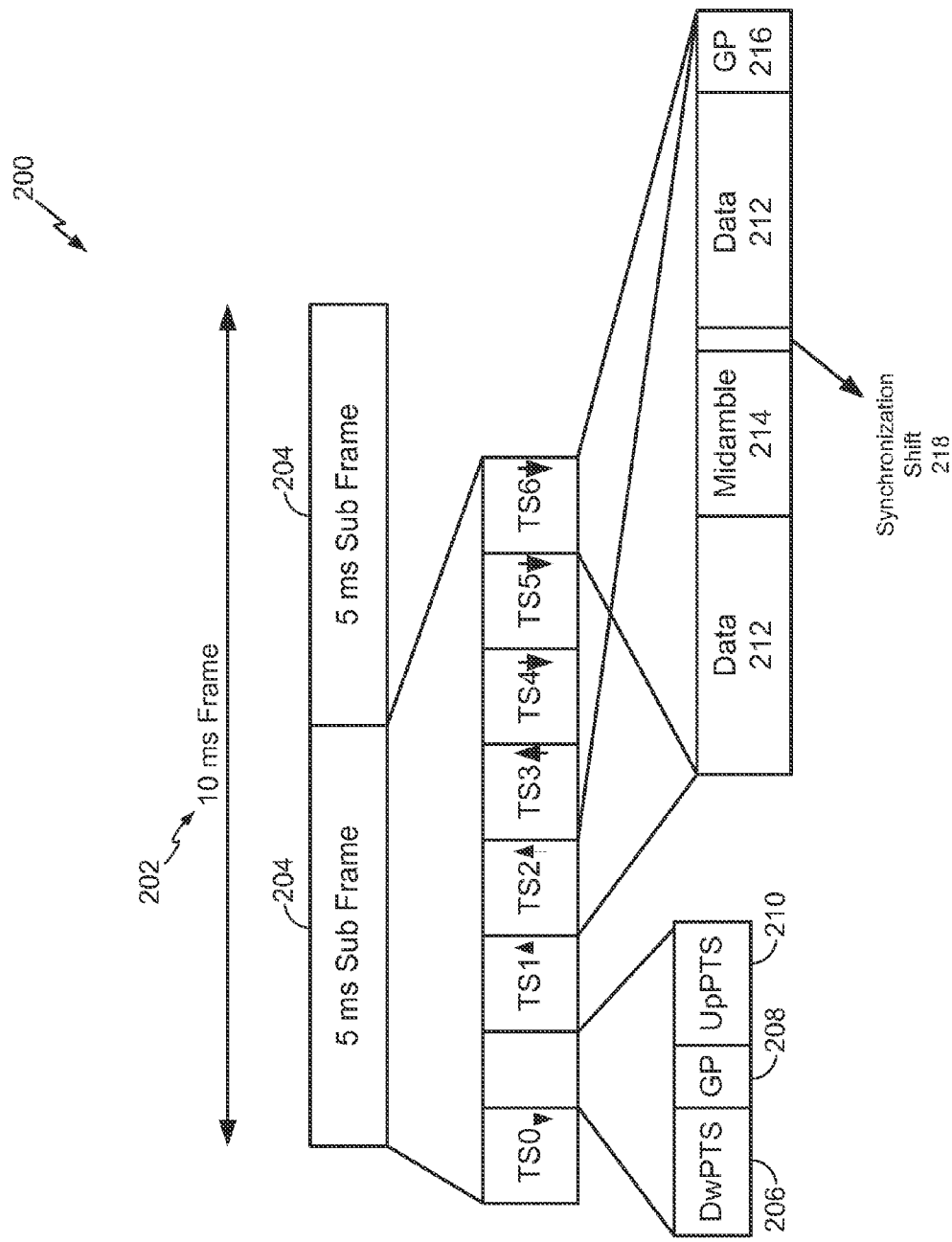
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
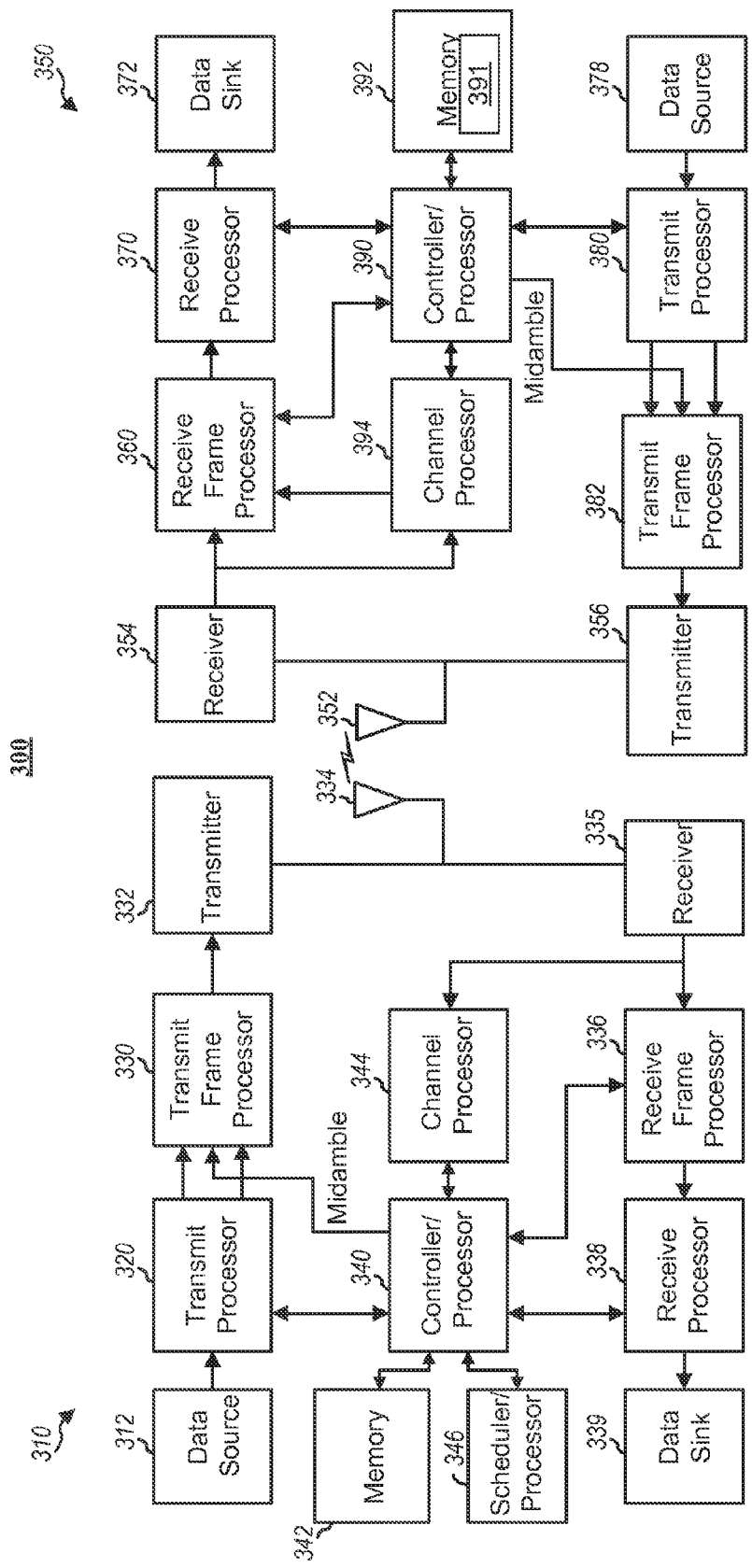
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded.

The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store an adjustable transmission power module 391 which, when executed by the controller/processor 390, adjusts the transmission power of the UE 350.

High speed uplink packet access (HSUPA) is an enhancement to TD-SCDMA, and is utilized to enhance uplink throughput. HSUPA introduces the following physical channels: enhanced uplink dedicated channel (E-DCH), E-DCH physical uplink channel (E-PUCH), E-DCH uplink control channel (E-UCCH), and E-DCH random access uplink control channel (E-RUCCH).

The E-DCH is a dedicated transport channel and may be utilized to enhance an existing dedicated channel (DCH) transport channel carrying data traffic. The E-PUCH carries E-DCH traffic and scheduling information (SI). The e-PUCH can be transmitted in burst fashion. The E-UCCH carries Layer 1 information for E-DCH. The E-RUCCH includes the uplink physical control channel and carries scheduling information (SI), including a scheduling request and the UE ID (i.e., enhanced radio network temporary identifier (E-RNTI).)

The UE transmits uplink synchronization code (SYNC-UL) in the uplink pilot time slot (UpPTS) or in another uplink access position indicated by higher layers using the selected uplink pilot channel (UpPCH) sub channel and open loop power control. After sending an uplink sync code (SYNC-UL), the UE waits for the network acknowledgement on the relevant fast physical access channel (FPACH).

If the UE does not receive any response from the Node B, the UE adjust its transmission (Tx) time and transmission power level based on a new measurement. The UE then sends an uplink sync code (SYNC-UL) again after a random delay. For each transmission (or retransmission), the uplink sync code (SYNC-UL) and the UpPCH sub channel are randomly selected again by the UE. The radio network controller (RNC) signals the power ramp up step size and the maximum number of allowable re-transmissions. After the Node B detects the SYNC-UL sequence, it carries the acknowledgement of the detected SYNC-UL and a power level adjustment indication in a single burst to the UE. The UE uses the power level indication carried in the FPACH to send the E-RUCCH for a scheduling request.

The E-PUCH transmission power, ($P_{E-PUCH}$), is the transmit power of the E-DCH physical channel E-PUCH. The path loss term, (L), may be utilized by the UE for taking updated path loss into account, if indicated as allowed by higher layers. The gain factor, ($\beta_e$) may be applied for the selected enhanced transport format combination (E-TFC) transport block size, channel codes, modulation scheme, and MAC-d flow HARQ power offset.

The base reference power, ($P_{e-base}$), is used to compute E-PUCH power with respect to different E-DCH data rates and is a closed loop quantity maintained by both the UE and Node B. The $P_{e-base}$ value is incremented or decremented by a value $\Delta e$-base upon each receipt of a transmit power control (TPC) command. In particular, the $P_{e-base}$ value is updated every time an up and down power command is received.

The reference desired E-PUCH receive power value, ($PRX_{dex-base}$), is a network indicated value. This value is typically received during the initial call set up (e.g., when the UE transitions from idle mode to connect mode). In particular, the $PRX_{dex-base}$ value is signalled by the radio resource control (RRC) during call setup and is set to the average value of the interference signal power level over the time slots configured for the E-PUCH.

The uplink interference may dynamically change. Additionally, the instantaneous uplink interference of the NodeB may affect the configuration of the $PRX_{dex-base}$ value by the radio network controller (RNC). During the initial TD-HSUPA data transmission, a low uplink high speed throughput speed may be caused by insufficient E-PUCCH transmit power when using the $PRX_{dex-base}$ value indicated by the radio network controller to drive the E-PUCH transmission. The low uplink high speed throughput speed may also arise when the UE uses a higher transmission power than needed for the initial E-PUCCH transmission, which may cause high interference.

One aspect of the present disclosure is directed to configuring the UE to transmit E-PUCH with the proper power to reduce E-PUCH transmission errors, thereby improving the uplink throughput and user perception. In particular, the UE adjusts the initial E-PUCH transmission power based on whether a random access channel is configured on an uplink traffic time slot. The adjustment dynamically adapts to the uplink interference. For example, when the uplink pilot channel (UpPCH) is configured on the uplink traffic time slots, the $PRX_{dex-base}$ value is adjusted based on the latest E-RUCCH transmission power, where E-RUCCH is for a schedule request. If a random access channel is not configured on the uplink traffic time slot (e.g., when UpPCH is on a special time slot), the UE uses a non-adjusted $PRX_{dex-base}$ value for the initial E-PUCH transmission.

Figure 4:
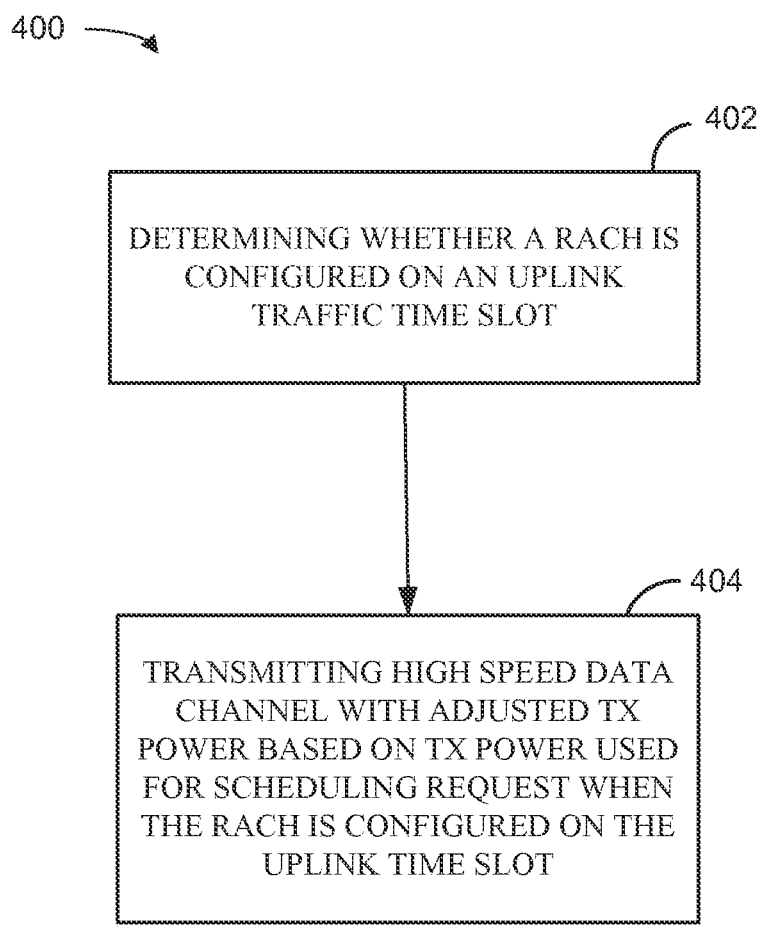
FIG. 4 is a block diagram illustrating a method for adjusting the initial transmission power according to one aspect of the present disclosure.

FIG. 4 illustrates an example wireless communication method 400 according to one aspect of the disclosure. Initially, in box 402, a UE 350 determines whether a random access channel (RACH) is configured on an uplink traffic time slot (TS). When the UE determines RACH is configured in an uplink traffic time slot, the UE then transmits a high speed data channel (e.g. E-PUCH) based at least partially on the transmission power used for a scheduling request, as shown in box 404.

Figure 5:
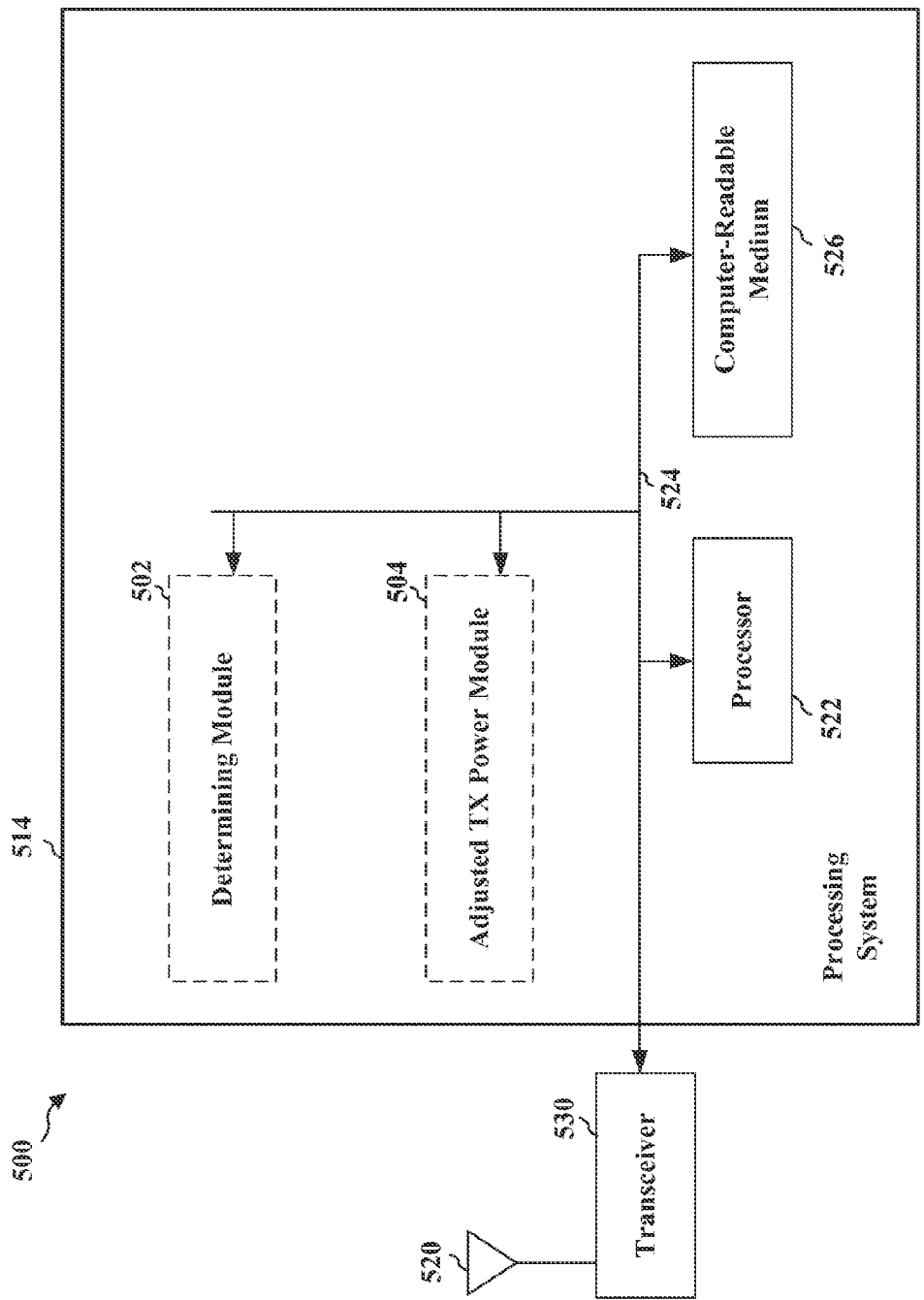
FIG. 5 is a diagram illustrating an example of a hardware implementation for an apparatus employing a processing system according to one aspect of the present disclosure.

FIG. 5 is a diagram illustrating an example of a hardware implementation for an apparatus 500 employing a wireless communication system 514 according to an aspect of the present disclosure. The wireless communication system 514 may be implemented with a bus architecture, represented generally by the bus 524. The bus 524 may include any number of interconnecting buses and bridges depending on the specific application of the wireless communication system 514 and the overall design constraints. The bus 524 links together various circuits including one or more processors and/or hardware modules, represented by the processor 522 the modules 502, 504, and the computer-readable medium 526. The bus 524 may also link various other circuits such as timing sources, peripherals, voltage regulators, and power management circuits, which are well known in the art, and therefore, will not be described any further.

The apparatus includes the wireless communication system 514 coupled to a transceiver 530. The transceiver 530 is coupled to one or more antennas 520. The transceiver 530 enables communicating with various other apparatus over a transmission medium. The wireless communication system 514 includes a processor 522 coupled to a computer-readable medium 526. The processor 522 is responsible for general processing, including the execution of software stored on the computer-readable medium 526. The software, when executed by the processor 522, causes the wireless communication system 514 to perform the various functions described for any particular apparatus. The computer-readable medium 526 may also be used for storing data that is manipulated by the processor 522 when executing software.

The wireless communication system 514 includes a determining module 502 for determining whether a RACH is configured on an uplink time slot. The wireless communication system 514 also includes an adjusted transmission (TX) power module 504 for adjusting the transmission power of a high speed data channel The modules may be software modules running in the processor 522, resident/stored in the computer-readable medium 526, one or more hardware modules coupled to the processor 522, or some combination thereof.

The wireless communication system 514 may be a component of the UE 350 and may include the memory 392, and/or the controller/processor 390.

In one configuration, an apparatus such as a UE is configured for wireless communication including means for determining and means for transmitting. In one aspect, the determining means can be the controller/processor 390, the memory 392, the adjustable transmission power module 391, the determining module 502 and/or the wireless communication system 514. The transmitting means can be the antennas 352, the controller/processor 390, the transmit processor 380, the transmit frame processor 382, the memory 392, the adjustable transmission power module 391, the adjusted TX power module 504, and/or the wireless communication system 514 configured to perform the functions recited by the aforementioned means. In another aspect, the aforementioned means may be a module or any apparatus configured to perform the functions recited by the aforementioned means.

Several aspects of a telecommunications system has been presented with reference to HSUPA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   determining whether a random access channel is configured on an uplink traffic time slot;
   adjusting a transmission power of an initial high speed data channel transmission from a network indicated transmit power to a transmission power used for a scheduling request when the random access channel is configured on the uplink traffic time slot, the initial high speed data channel being different from the random access channel; and
   transmitting the initial high speed data channel transmission with the adjusted transmit power.

2. The method of claim 1, further comprising transmitting the initial high speed data channel transmission with the network indicated transmit power based at least in part on transmit power used for a scheduling request when the random access channel is configured on a time slot that is different from the uplink traffic time slot.

3. The method of claim 1, in which the high speed data channel comprises an enhanced dedicated channel physical uplink channel (E-PUCH).

4. The method of claim 1, in which the random access channel comprises an uplink pilot channel (UpPCH).

5. The method of claim 1 in which a schedule request channel comprises an enhanced dedicated channel random access uplink control channel (E-RUCCH).

6. The method of claim 1, in which the time slot comprises an uplink pilot time slot (UpPTS).

7. An apparatus for wireless communication, comprising:
a memory; and
at least one processor coupled to the memory, the at least one processor being configured:
  to determine whether a random access channel is configured on an uplink traffic time slot;
  to adjust a transmission power of an initial high speed data channel transmission from a network indicated transmit power to a transmission power used for a scheduling request when the random access channel is configured on the uplink traffic time slot, the initial high speed data channel being different from the random access channel; and
  to transmit the initial high speed data channel transmission with the adjusted transmit power.

8. The apparatus of claim 7, in which the at least one processor is further configured to transmit the initial high speed data channel transmission with the network indicated transmit power based at least in part on transmit power used for a scheduling request when the random access channel is configured on a time slot that is different from the uplink traffic time slot.

9. The apparatus of claim 7, in which the high speed data channel comprises an enhanced dedicated channel physical uplink channel (E-PUCH).

10. The apparatus of claim 7, in which the random access channel comprises an uplink pilot channel (UpPCH).

11. The apparatus of claim 7, in which a schedule request channel comprises an enhanced dedicated channel random access uplink control channel (E-RUCCH).

12. The apparatus of claim 7, in which the time slot comprises an uplink pilot time slot (UpPTS).

13. A computer program product for wireless communication in a wireless network, comprising:
a non-transitory computer-readable medium having non-transitory program code recorded thereon, the program code comprising:
  program code to determine whether a random access channel is configured on an uplink traffic time slot;
  program code to adjust a transmission power of an initial high speed data channel transmission from a network indicated transmit power to a transmission power used for a scheduling request when the random access channel is configured on the uplink traffic time slot, the initial high speed data channel being different from the random access channel; and
  program code to transmit the initial high speed data channel transmission with the adjusted transmit power.

14. The computer program product of claim 13, in which the program code further comprises program code to transmit the initial high speed data channel transmission with the network indicated transmit power based at least in part on transmit power used for a scheduling request when the random access channel is configured on a time slot that is different from the uplink traffic time slot.

15. The computer program product of claim 13, in which the high speed data channel comprises an enhanced dedicated channel physical uplink channel (E-PUCH).

16. The computer program product of claim 13, in which the random access channel comprises an uplink pilot channel (UpPCH).

17. An apparatus for wireless communication, comprising:
means for determining whether a random access channel is configured on an uplink traffic time slot;
means for adjusting a transmission power of an initial high speed data channel transmission from a network indicated transmit power to a transmission power used for a scheduling request when the random access channel is configured on the uplink traffic time slot, the initial high speed data channel being different from the random access channel; and
means for transmitting the initial high speed data channel transmission with the adjusted transmit power.

18. The apparatus of claim 17, further comprising means for transmitting the initial high speed data channel transmission with the network indicated transmit power based at least in part on transmit power used for a scheduling request when the random access channel is configured on a time slot that is different from the uplink traffic time slot.

19. The apparatus of claim 17, in which the high speed data channel comprises an enhanced dedicated channel physical uplink channel (E-PUCH).

20. The apparatus of claim 17, in which the random access channel comprises an uplink pilot channel (UpPCH).

* * * * *